Nov. 22, 1927.
E. L. BOYD
1,649,804
COVER FOR AUTOMOBILE TIRE VALVE STEMS
Filed Sept. 24, 1926
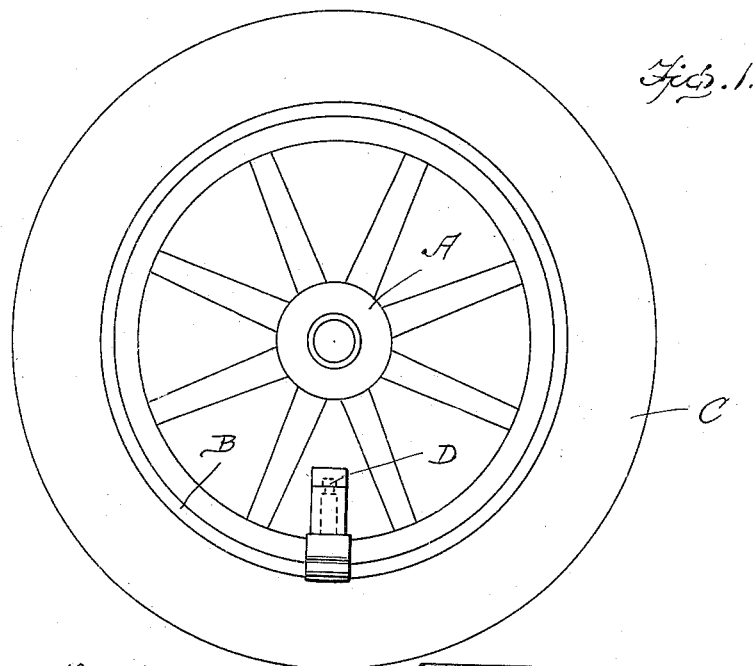
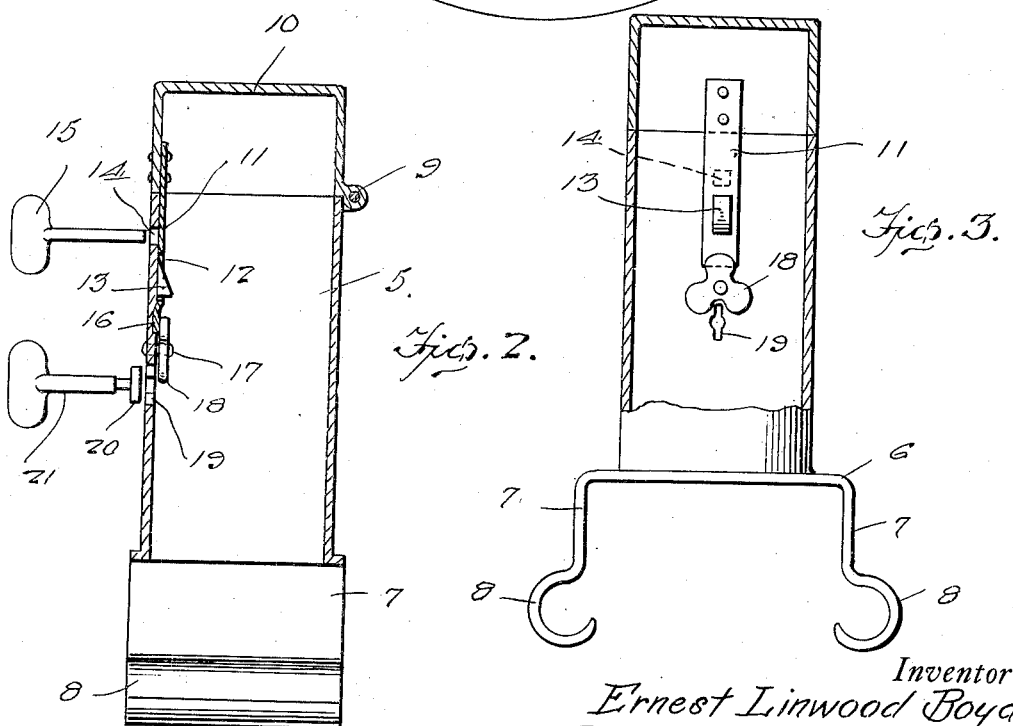
Inventor
Ernest Linwood Boyd
By Clarence A O'Brien
Attorney Patented Nov. 22, 1927.

1,649,804

UNITED STATES PATENT OFFICE.

ERNEST LINWOOD BOYD, OF GARNER, TEXAS.

COVER FOR AUTOMOBILE TIRE-VALVE STEMS.

Application filed September 24, 1926. Serial No. 137,515.

This invention relates generally to locks, and has more particular reference to a cover for automobile tire-valve stems that may be readily applied to tired vehicle wheels for enclosing the valve stems of the tires in order that the usual retaining nuts cannot be removed by unwarranted persons for obviously preventing the theft of the tires without greatly damaging the same.

One of the main objects of the invention is to provide a device of this character that is extremely simple of construction, one that may be readily installed for permanent association with the wheel.

A further and important object of the invention is to provide a device that is also so constructed as to prevent malicious persons from tampering with the valve stem and exhausting the air from the tire.

Other objects and advantages of the invention will become apparent from the following description taken in connection with the accompanying drawing.

In the accompanying drawing forming part of this application and in which:

Figure 1 is a side elevation of a conventional tired vehicle wheel equipped with my improved valve stem cover, Fig. 2 is a detail vertical section of the cover per se, and Fig. 3 is a view also in section taken at right angles to Fig. 2 and more clearly disclosing the locking mechanism for the lid of the cover.

Now having particular reference to the drawing, A designates a conventional vehicle wheel upon the rim B of which is the usual pneumatic tire C.

The invention per se consists of an open ended metallic tube 5 preferably of circular formation, the lower end of which is formed with a cross plate 6, the ends of which are bent downwardly as at 7—7 to fit along the opposite side of the wheel felly, the lower ends of said downwardly bent portions 7—7 being properly curved as at 8—8 for tight fit around the flanges of the rim B.

Hingedly secured to the open upper ends of the tube 5 as at 9, is a lid 10, to the inner side of the outer wall of which is secured a depending spring metal plate 11. This plate 11 is formed adjacent its lower end with a slot 12 for receiving a tapered lug 13 upon the interior of the tube 5 when the lid 11 is closed, so as to obviously prevent the raising of said lid.

The tube 5 is formed directly beneath its open upper end with a square-shaped hole 14 for receiving the squared stem of a key 15, the purpose of which is to forcibly move the spring metal plate 11 out of engagement with the lug 13 so that the lid may be raised.

The extreme lower end of the spring metal plate is bent slightly inwardly as at 16 for disposition within a depression at the interior of the tube 5 as in Fig. 2, there being pivoted to the tube as at 17 directly beneath the lower curved end of the spring metal plate, a clover-shaped latch plate 18, the various wings of which will engage over the lower end of the spring metal plate, so as to prevent the same from being forced out of engagement with the lug 13, unless said latch plate has been turned to the proper position.

The tube 5 is formed directly beneath this latch plate 18 with a T-shaped slot 19, through which is to be passed the headed end 20 of a suitable key 21. When the head of the key is inserted in the slot, the same will engage between adjacent wings of the latch plate 18 so as to facilitate the turning of the same in order that it may be moved out of engagement with the lower end of the spring metal spring plate after which the space may be forcibly swung rearwardly by reason of the key 15, for obviously permitting of the raising of the lid 10 so that access may be had to the valve stem D to permit of the removal of the valve stem locking nut or to allow of the proper inflation or deflation of the tire C.

It will thus be seen that I have provided a highly novel, simple and efficient form of device for preventing unauthorized access to the valve stems of automobile wheel tires which is always necessary to permit of the removal of the tire with respect to the wheel.

Even though I have herein shown and described the invention as consisting of certain details of construction, it is nevertheless to be understood that some changes may be made therein without affecting the spirit and scope of the appended claim.

Having thus described my invention, what I claim as new is:—

As a new product of manufacture, a cover for an automobile tire valve stem comprising an open ended tubular cylinder, a lid hingedly connected to one end for closing said end, retaining means for said lid, and means connected to the opposite open end of the cylinder whereby it may be detachably connected with an automobile wheel rim, said means embodying a plate having right angular extensions terminating in resilient hooks, constructed to conform to and detachably engage the wheel rim flanges.

In testimony whereof I affix my signature.

ERNEST LINWOOD BOYD.